United States Patent
Van Rompuy et al.

[11] Patent Number: 5,985,515
[45] Date of Patent: Nov. 16, 1999

[54] HEAT SENSITIVE IMAGING ELEMENT AND A METHOD FOR PRODUCING LITHOGRAPHIC PLATES THEREWITH

[75] Inventors: Ludo Van Rompuy, Mortsel; Luc Leenders, Herentals; Bart Aerts, Rumst, all of Belgium

[73] Assignee: AGFA-Gevaert, N.V., Mortsel, Belgium

[21] Appl. No.: 09/025,438

[22] Filed: Feb. 18, 1998

Related U.S. Application Data

[60] Provisional application No. 60/045,031, Apr. 28, 1997.

[30] Foreign Application Priority Data

Mar. 7, 1997 [EP] European Pat. Off. ............ 97200689

[51] Int. Cl.$^6$ ............................... G03C 1/76; G03F 7/26
[52] U.S. Cl. ..................... 430/272.1; 430/273.1; 430/944; 430/200; 430/201; 430/302; 101/457
[58] Field of Search ............................ 430/273.1, 272.1, 430/944, 200, 201, 302; 101/457

[56] References Cited

U.S. PATENT DOCUMENTS

| | | |
|---|---|---|
| 4,054,094 | 10/1977 | Cadell et al. . |
| 5,395,954 | 3/1995 | Soria et al. . |
| 5,725,989 | 3/1998 | Chang et al. ........................... 430/201 |
| 5,807,659 | 9/1998 | Nishimiya et al. ..................... 430/302 |

*Primary Examiner*—Cynthia Hamilton
*Assistant Examiner*—Barbara Gilmore
*Attorney, Agent, or Firm*—Breiner & Breiner

[57] ABSTRACT

According to the present invention there is provided a heat mode imaging element comprising in the order given:
i) a lithographic base,
ii) a heat ablatable recording layer and
iii) a top layer having an opposite affinity for ink or an ink abhesive fluid than the lithographic base,
characterized in that the top layer comprises as main substance an inorganic-organic composite material wherein the inorganic phase is formed by controlled hydrolysis and polycondensation of a metal alkoxide and the organic phase is an organic polymer or copolymer linked to at least one inorganic atom.

12 Claims, No Drawings

HEAT SENSITIVE IMAGING ELEMENT AND A METHOD FOR PRODUCING LITHOGRAPHIC PLATES THEREWITH

This application is based on provisional application Ser. No. 60/045,031 filed Apr. 28, 1997.

1. FIELD OF THE INVENTION

The present invention relates to a heat mode imaging material for making a lithographic printing plate. The present invention further relates to a method for preparing a printing plate from said heat mode imaging material.

2. BACKGROUND OF THE INVENTION

Lithography is the process of printing from specially prepared surfaces, some areas of which are capable of accepting lithographic ink, whereas other areas, when moistened with water, will not accept the ink. The areas which accept ink form the printing image areas and the ink-rejecting areas form the background areas.

In the art of photolithography, a photographic material is made imagewise receptive to oily or greasy ink in the photo-exposed (negative working) or in the non-exposed areas (positive working) on a hydrophilic background.

In the production of common lithographic plates, also called surface litho plates or planographic printing plates, a support that has affinity to water or obtains such affinity by chemical treatment is coated with a thin layer of a photo-sensitive composition. Coatings for that purpose include light-sensitive polymer layers containing diazo compounds, dichromate-sensitized hydrophilic colloids and a large variety of synthetic photopolymers. Particularly diazo-sensitized systems are widely used.

Upon imagewise exposure of such light-sensitive layer the exposed image areas become insoluble and the unexposed areas remain soluble. The plate is then developed with a suitable liquid to remove the diazonium salt or diazo resin in the unexposed areas.

Imaging elements which comprise a photosensitive composition are called photo mode imaging elements.

On the other hand, heat mode imaging elements, the surface of which can be made image-wise receptive or repellant to ink upon image-wise exposure to heat obtained by conversion of irradiation into heat and in most cases a subsequent development are also known for preparing lithographic printing plates. A particular disadvantage of photo mode imaging elements such as described above for making a printing plate is that they have to be shielded from the light. Furthermore they have a problem of sensitivity in view of the storage stability and they show a lower resolution. The trend towards heat mode printing plate precursors is clearly seen in the market.

Some interesting heat mode imaging materials contain a support with a hydrophilic surface, a hydrophobic covering layer and therein between as heat mode layer a layer capable of being ablated by actinic radiation as described in e.g. U.S. Pat. Nos. 5,379,698, 5,353,705, EP-A-683,728, 678,380, 649,374, 580,393, 580,394 and DE 2,512,038. Particularly interesting heat sensitive imaging elements are those where said layer capable of being ablated by actinic radiation is a layer of a low melting, non-toxic metal with a low thermal conductivity metal such as aluminum, bismuth, tin, indium, titanium and tellurium.

A problem that arises with the present ablation based printing plate precursors is that the adhesion between the top layer and the ablatable layer is not very strong. This results in staining of the printing plate and a low printing endurance. So, there is a need for heat mode imaging elements based on ablatable layers which have a strong adhesion between the heat ablatable metal layer and the top layer.

3. SUMMARY OF THE INVENTION

It is an object of the present invention to provide a heat mode imaging element for making in a convenient way a lithographic printing plate having excellent printing properties.

It is another object of the present invention to provide a method for obtaining in a convenient way a positive working lithographic printing plate of a high quality using said imaging element.

Further objects of the present invention will become clear from the description hereinafter.

According to the present invention there is provided a heat mode imaging element comprising in the order given:
i) a lithographic base,
ii) a heat ablatable recording layer and
iii) a top layer having an opposite affinity for ink or an ink abhesive fluid than the lithographic base,
characterized in that the top layer comprises as main substance an inorganic-organic composite or hybrid material wherein the inorganic phase is formed by controlled hydrolysis and polycondensation of a metal alkoxide and the organic phase is a polymer or copolymer linked to at least one inorganic atom.

According to the present invention there is also provided a method for obtaining a lithographic printing plate comprising the steps of:
i) image-wise or information-wise exposing to heat or actinic radiation an imaging element as described above thereby causing heating of said heat mode imaging element at the exposed areas and
ii) rubbing with or without a liquid said exposed heat mode imaging element to remove said heat ablatable recording layer and said top layer in said exposed areas.

4. DETAILED DESCRIPTION OF THE INVENTION

It has been found that lithographic printing plates of high quality can be obtained according to the method of the present invention using an imaging element as described above. More precisely it has been found that the adhesion between said top layer and the heat ablatable recording layer is very strong.

As it is clear from the summary above the gist of the present invention is the chemical nature of the main element forming the top layer: an inorganic-organic composite material formed e.g. according to the sol-gel technique.

The sol-gel reaction, well-known in scientific literature, describes in its original form a chemical route to synthetize inorganic polymers like glass or ceramics via a colloidal phase in solution. The basic chemistry is known since about 150 years (see Ebelmen, "Untersuchungen uber die Verbindungen der Borsaütire und Kieselsaüre mit ether", Ann. 57 (1846), p. 319–355). The general sol-gel reaction scheme is composed of a series of hydrolysis steps in conjunction with polycondensation steps. During the growth raction a colloid phase with particles or macromolecules in the nm range appear (sol) finally leading to a solid with a second phase within its pores.

More recently the sol-gel reaction has been used to prepare inorganic-organic composite materials. In this general reaction hydrolysis and polycondensation of a metal alkoxide species take place under the influence of a suitable catalyst e.g. an acid, and a network is formed in the process. During the build-up of this inorganic network alkoxymetal substituted organic polymers or copolymers are also present in the reaction medium and also undergo the same polycondensation reaction as the hydrolyzed metal alkoxides and are also incorporated in the network.

Particular types of inorganic-organic composite materials are named ORMOCERS (ORganically MOdified CEramics), ORMOSILS (ORganically MOdified SILicates) or CERAMERS. Scientific literature on inorganic-organic composite materials includes:

"The synthesis, structure and property behaviour of inorganic-organic hybrid network materials prepared by the sol-gel process", Wilkes at al., Proceedings of MRS Meeting, Boston Mass., November 1989;

"Sol-gel processes II: investigation and application", H. Reuter, Advanced Materials, 3 (1991) No 11, p. 568;

"New inorganic-organic hybrid materials through the sol-gel approach", Wilkes et al. , Chemistry of Materials, 1996, part VIII, p 1667–1681.

"Hybrid inorganic-organic materials by sol-gel processing of organofunctional metal alkoxides", Schubert et al., Chem. Mater. (1995), 7, p. 2010–2027.

Inorganic-organic composite materials are used in a variety of industrial applications. However, it is to our knowledge the first time that their use as part of a heat mode imaging element is disclosed.

According to a preferred embodiment of the invention the inorganic parts of said inorganic-organic composite materials are silicates obtained by hydrolysis and polycondensation of a silicium alkoxide such as TMEOS (tetramethylorthosilicate) or TEOS (tetraethylorthosilicate), forming a network in the process. During the build-up of this inorganic network alkoxysilanes substituted organic polymers or copolymers are also present in the reaction medium and also undergo the same polycondensation reaction as the hydrolyzed silicium alkoxides and are also incorporated in the network.

Said organic polymer or copolymer can be any organic polymer or copolymer containing alkoxysilane groups in the side chain. In a more preferred embodiment a copolymer obtainable by copolymerizing an ethylenically unsaturated monomer A with another ethylenically unsaturated monomer B functionalized with an alkoxysilane group is used. Said (co)polymers are preferably obtained by a radical (co)polymerization, well known to anybody skilled in the art.

Said ethylenically unsaturated monomer A can be any ethylenically unsaturated monomer such as ethylene, vinyl chloride and styrene. Said monomer A is preferably an ethylenically unsaturated monomer comprising an acid group in the side chain e.g. oleic acid and 1-octadecenoic acid or derivatives thereof comprising an ester or an amide group, more preferably acrylic acid, methacrylic acid and derivatives thereof such as esters, amides and nitrites. Said ester or amide group of said monomer A can contain a hydrocarbon group preferably containing 1 to 20 C atoms, but can also contain a perfluoroalkyl group.

Said monomer B is preferably an ester or an amide of acrylic acid or methacrylic acid whereby the alkoxysilane group is linked to the (meth)acryoyl group over the ester or the amide function . The amount by weight of monomer B in the polymer or the copolymer ranges from 1% to 100%, more preferably from 5% to 50%, most preferably from 10% to 35%.

The ratio of the amount by weight of the inorganic phase (for a ORMOSIL the Si—O groups) to the organic phase of the inorganic-organic composite is preferably between 1% and 50%, more preferably between 2% and 30%, most preferably between 4% and 20%. Said ratio is determined by the amount of alkoxymetal added to the organic polymer or copolymer.

An example of an inorganic-organic composite coating according to the present invention used as a layer on top of a heat ablatable recording layer was prepared in two steps:
1. synthesis of a prepolymer poly(methylmethacrylate-co-methacryloyloxypropyltrimethoxysilane), abbreviated poly(MMA-co-MOPTS);
2. application of the layer with a coating knife and cross-linking by TEOS.

Step 1 was carried out as follows. The reaction was performed in in a 2 liter double-walled glass cylinder, equipped with a reflux cooler, a mechanical stirrer, a thermometer and an inlet, below liquid level, for nitrogen gas. In this reaction vessel were successively added at room temperature:

800 ml of methylethylketone dried on potassium carbonate;

10 g of methacryloyloxypropyltrimethoxysilane;

40 g of methylmethacrylate;

0.25 g of azobisisobutyronitrile.

The reaction mixture was continuously treated with nitrogen gas and kept free from air. The reaction mixture was stirred at 100 rpm while the temperature was raised to 79° C. Then the reaction mixture was thermostatized at 79° C. After 30 minutes a mixture of 10 g of methacryloyloxypropyltrimethoxysilane, 160 g of methylmethacrylate and 1 g of azobisisobutyronitrile was added to the reaction mixture over a period of 2 hours. Then the solution was thermostatized for another 20 hours at 79° C. The obtained solution of the prepolymer could be used without further purification for step 2.

In order to perform step 2 the following coating composition was prepared:

| | |
|---|---|
| prepolymer solution according to step 1 | 87.9 ml |
| TEOS | 9.3 ml |
| water | 1.4 ml |
| formic acid | 1.4 ml |
| total | 100 ml |

The viscosity of this coating composition at 36° C. was 23.3 mPa.s and the static surface tension was 25.2 mN/m.

This solution was stirred for one hour at room temperature and then coated on a heat ablatable recording layer and dried.

One of the possible reaction products is represented in scheme 1.

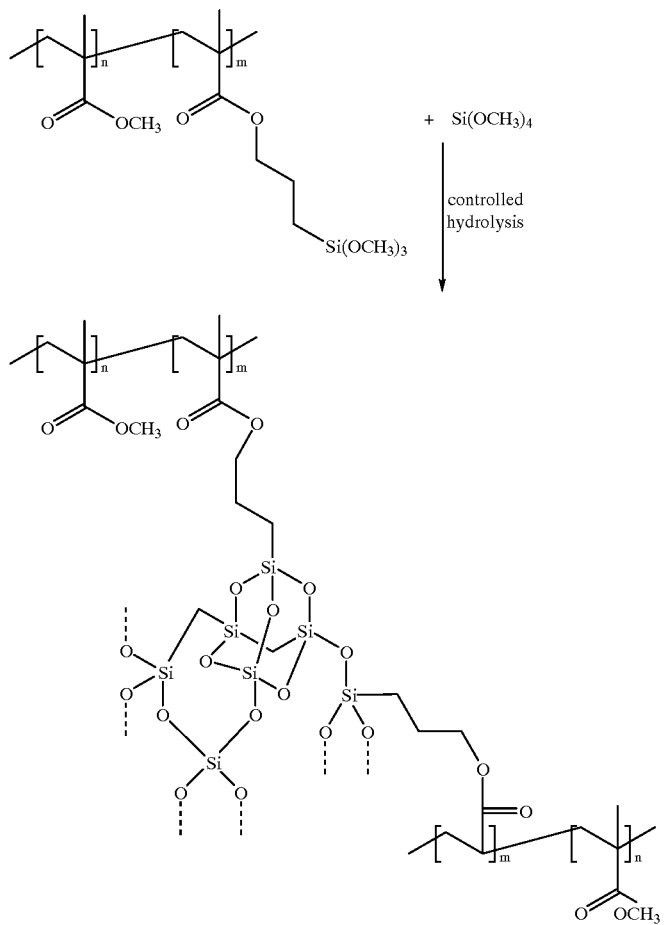

In a preferred embodiment the heat mode imaging element comprises in the order given:
i) a lithographic base having a hydrophilic surface,
ii) a heat ablatable recording layer
iii) a hydrophobic top layer comprising as main substance an inorganic-organic composite material wherein the inorganic phase is formed by controlled hydrolysis and polycondensation of a metal alkoxide according to the sol-gel process and the organic phase is an organic polymer or copolymer linked to at least one inorganic atom.

The hydrophobic layer is preferably coated on the heat ablatable layer in a dry weight in the range between 0.1 and 5 g/m², more preferably between 0.2 and 2 g/m², most preferably between 0.4 and 0.7 g/m².

The heat ablatable recording layer according to one embodiment of the invention is preferably a vapour or vacuum deposited layer of a metal or a metal derivative. Suitable metals are e.g. aluminum, bismuth, tin, titanium, indium, tellurium etc. Preferably bismuth is used. Also metal derivatives can be used such as metal oxides, metal suboxides, metal carbides, metal nitrides etc.

According to another embodiment of the present invention the heat ablatable recording layer may be comprised of a compound converting light into heat dissolved or dispersed optionally in a binder. Suitable compounds capable of converting light into heat are preferably infrared absorbing components although the wavelength of absorption is not of particular importance as long as the absorption of the compound used is in the wavelength range of the light source used for image-wise exposure. Particularly useful compounds are for example dyes and in particular infrared dyes, carbon black, metal carbides, borides, nitrides, carbonitrides, bronze-structured oxides and oxides structurally related to the bronze family but lacking the A component e.g. $WO_{2.9}$. It is also possible to use conductive polymer dispersion such as polypyrrole or polyaniline-based conductive polymer dispersions. The lithographic performance and in particular the print endurance obtained depends on the heat-sensitivity of the imaging element. In this respect it has been found that carbon black yields very good and favorable results. Suitable binders are e.g. gelatin, cellulose, cellulose esters e.g. cellulose acetate, nitrocellulose, polyvinylalcohol, polyvinyl pyrrolidone, a copolymer of vinylidene chloride and acrylonitrile, poly (meth)acrylates and polyvinyl chloride.

Preferably the thickness of the heat ablatable recording layer is not more than 3 μm and most preferably not more than 1 μm. In case a vapour or vacuum deposited metal layer is used as a recording layer the thickness thereof is preferably such that the optical density is between 0.3 and 5 and more preferably between 1 and 4.

According to one embodiment of the present invention, the lithographic base can be anodized aluminum. A particularly preferred lithographic base is an electrochemically grained and anodized aluminum support. According to the present invention, an anodized aluminum support may be treated to improve the hydrophilic properties of its surface. For example, the aluminum support may be silicated by treating its surface with sodium silicate solution at elevated temperature, e.g. 95° C. Alternatively, a phosphate treatment may be applied which involves treating the aluminum oxide surface with a phosphate solution that may further contain an inorganic fluoride. Further, the aluminum oxide surface may be rinsed with a citric acid or citrate solution. This treatment may be carried out at room temperature or can be carried out at a slightly elevated temperature of about 30 to 50° C. Still further the aluminum oxide surface may be treated with polyvinyl phosphonic acid. A further interesting treatment involves rinsing the aluminum oxide surface with a bicarbonate solution. It is further evident that one or more of these post treatments may be carried out alone or in combination.

According to another embodiment in connection with the present invention, the lithographic base comprises a glass support or a flexible support, such as e.g. paper or plastic film, provided with a cross-linked hydrophilic layer. A particularly suitable cross-linked hydrophilic layer may be obtained from a hydrophilic binder cross-linked with a cross-linking agent such as formaldehyde, glyoxal, polyisocyanate or a hydrolyzed tetra-alkylorthosilicate. The latter is particularly preferred.

As hydrophilic binder there may be used hydrophilic (co)polymers such as for example, homopolymers and copolymers of vinyl alcohol, acrylamide, methylol acrylamide, methylol methacrylamide, acrylic acid, methacrylic acid, hydroxyethyl acrylate, hydroxyethyl methacrylate or maleic anhydride/vinylmethylether copolymers. The hydrophilicity of the (co)polymer or (co)polymer mixture used is preferably the same as or higher than the hydrophilicity of polyvinyl acetate hydrolyzed to at least an extent of 60 percent by weight, preferably 80 percent by weight.

The amount of crosslinking agent, in particular of tetraalkyl orthosilicate, is preferably at least 0.2 parts by weight per part by weight of hydrophilic binder, preferably between 0.5 and 5 parts by weight, more preferably between 1.0 parts by weight and 3 parts by weight.

A cross-linked hydrophilic layer in a lithographic base used in accordance with the present embodiment preferably also contains substances that increase the mechanical strength and the porosity of the layer. For this purpose colloidal silica may be used. The colloidal silica employed may be in the form of any commercially available water-dispersion of colloidal silica for example having an average particle size up to 40 nm, e.g. 20 nm. In addition inert particles of larger size than the colloidal silica can be added e.g. silica prepared according to Stöber as described in J. Colloid and Interface Sci., Vol. 26, 1968, pages 62 to 69 or alumina particles or particles having an average diameter of at least 100 nm which are particles of titanium dioxide or other heavy metal oxides. By incorporating these particles the surface of the cross-linked hydrophilic layer is given a uniform rough texture consisting of microscopic hills and valleys, which serve as storage places for water in background areas.

The thickness of a cross-linked hydrophilic layer in a lithographic base in accordance with this embodiment may vary in the range from 0.2 to 25 µm and is preferably 1 to 10 µm.

Particular examples of suitable cross-linked hydrophilic layers for use in accordance with the present invention are disclosed in EP-A 601240, GB-P-1419512, FR-P-2300354, U.S. Pat. No. 3,971,660, U.S. Pat. No. 4,284,705 and EP-A 514490.

As glass support of a lithographic base in connection with the present embodiment glass can be used having a thickness of not more than 0.5 mm, a failure stress of at least $10^7$ Pa and a Youngs modulus of not more than $10^{11}$ Pa.

As flexible support of a lithographic base in connection with the present embodiment it is particularly preferred to use a plastic film e.g. substrated polyethylene terephthalate film, cellulose acetate film, polystyrene film, polycarbonate film etc. . . . The plastic film support may be opaque or transparent. When the support is transparent, the exposure can take place through the support.

The heat mode imaging element used in accordance with the invention may contain additional layers such as e.g. one or more layers between the lithographic base and the heat ablatable recording layer for improving the adhesion of the heat ablatable recording layer to the lithographic base or intermediate layers between the hydrophobic layer and the heat ablatable recording layer. The shelf life of the imaging element may be influenced by the composition of the intermediate layers.

The heat mode imaging element in connection with the present invention is preferably exposed using a laser. Preferably used lasers are e.g. semiconductor lasers, YAG lasers e.g. Nd-YAG lasers, etc. The laser may have a power output between 40 and 7500 mW and preferably operates in the infrared part of the spectrum. Rubbing of the image-wise exposed heat mode recording material can be done using a brush, a cotton pad etc. Rubbing of the heat mode recording material in connection with the present invention can be carried out without the presence of a liquid. In this way images of good contrast and high density can be obtained. Rubbing may however also be carried out in the presence of a liquid for a better cleaning of the exposed areas without any detrimental effect on the image quality.

The present invention will now be illustrated by the following examples without however limiting it thereto. All parts are by weight unless otherwise specified.

EXAMPLE 1

Preparation of the lithographic base

To 440 g of a dispersion containing 21.5% of $TiO_2$ (average particle size 0.3 to 0.4 µm) and 2.5% of polyvinyl alcohol in deionized water were subsequently added, while stirring, 250 g of a 5% of polyvinyl alcohol solution in water, 105 g of a hydrolyzed 22% tetramethylorthosilicate emulsion in water and 12 g of a 10% solution of a wetting agent.

To this mixture was added 193 g of deionized water and the pH was adjusted to pH=4.

The obtained dispersion was coated on a polyethyleneterephthalate film support (coated with a hydrophilic adhesion layer) to a wet coating thickness of 50 g/m², dried at 30° C., and subsequently hardened by subjecting it to a temperature of 57° C. for 1 week.

Deposition of the metallic film

A cylindrical vacuum chamber contained an electrically heated refractory tray in which bismuth was present as metal vapour source. Under high vacuum (i.e. at a pressure of about $10^{-2}$ Pa) the obtained metal vapour was directed towards the hydrophilic surface of the lithographic base and was deposited thereon at a thickness of 0.2 µm.

Coating and curing of the hydrophobic layer

On top of the bismuth layer a layer of ORMOSIL was coated with the following composition:

70 g of a 27.35% solution of a copolymer methyl-methacrylate(80)-methacrylate-propylsiloxane(20) in methyl-ethyl-ketone 6.7 g of tetraethyl orthosilicate (TEOS)

1 g of water 1 g of formic acid.

The mixture containing 30.6 g material/100 g solution was stirred for one hour at room temperature.

The solution was then coated on the bismuth layer with a coating knife to a final coverage of 1.5 g/m². After drying the material was then imagewise exposed to a NdYLF laser source (1053 nm) on an external drum device rotating at a speed of 1.1 m/s.

After exposure, the plates were cleaned with a water moistened tissue, rubbing off the imaged parts.

The plates were then printed on a Heidelberg GTO 46 printing press using ABDick 1020 ink and Rotamatic fountain solution.

Up to 100 copies were printed, showing a good image quality, that is single scan lines and plain image areas were clearly visible on the printed copy.

EXAMPLE 2

Preparation of the lithographic base

A 0.20 mm thick aluminum foil was degreased by immersing the foil in an aqueous solution containing 5 g/l of sodium hydroxide at 50° C. and rinsed with demineralized water. The foil was then electrochemically grained using an alternating current in an aqueous solution containing 4 g/l of hydrochloric acid, 4 g/l of hydroboric acid and 5 g/l of aluminum ions at a temperature of 35° C. and a current density of 1200 A/m² to form a surface topography with an average center-line roughness Ra of 0.5 μm.

After rinsing with demineralized water the aluminum foil was then etched with an aqueous solution containing 300 g/l of sulfuric acid at 60° C. for 180 seconds and rinsed with demineralized water at 25° C. for 30 seconds.

The foil was subsequently subjected to anodic oxidation in an aqueous solution containing 200 g/l of sulfuric acid at a temperature of 45° C., a voltage of about 10 V and a current density of 150 A/m² for about 300 seconds to form an anodic oxidation film of 3.00 g/m² of $Al_2O_3$, then washed with demineralized water, posttreated with a solution containing 20 g/l of sodium bicarbonate at 40° C. for 30 seconds, subsequently rinsed with demineralized water at 20° C. during 120 seconds and dried.

The deposition of the metallic film was carried out as described in example 1. Also the coating and curing of the hydrophobic layer and the exposure of the heat mode imaging element was carried out as described in example 1 with the exception that the ORMOSIL containing layer was coated to a final coverage of 3 g/m².

The exposed imaging element was processed by tearing off the imaged parts with Scotch Pressure Adhesive tape. Imaged areas where no longer ink receptive when printed on a Rotamatic R35 printing press, equipped with a compressible rubber blanket, and using ABDick 1020 ink and Rotamatic fountain solution.

Up to 100 copies were printed, showing a good image quality, that is single scan lines and plain image areas were clearly visible on the printed copy.

We claim:

1. A heat mode imaging element comprising in the order given:
    i) a lithographic base,
    ii) a heat ablatable recording layer and
    iii) a top layer having an opposite affinity for ink or an ink abhesive fluid than the lithographic base, characterized in that the top layer comprises as main substance an inorganic-organic composite material wherein the inorganic phase is formed by controlled hydrolysis and polycondensation of a metal alkoxide and the organic phase is an organic polymer or copolymer linked to at least one inorganic atom and wherein the ratio of the amount by weight of the inorganic phase to the organic phase of the in organic-organic composite is between 1% and 50%.

2. A heat mode imaging element according to claim 1 wherein the inorganic phase of said inorganic-organic composite materials is a silicate obtained by hydrolysis and polycondensation of a silicium alkoxide, forming a network in the process.

3. A heat mode imaging element according to claim 1 wherein said organic phase is an organic polymer or copolymer obtainable by polymerizing or copolymerizing an ethylenically unsaturated monomer B comprising an alkoxysilane group .

4. A heat mode imaging element according to claim 3 wherein said monomer B is copolymerized with an ethylenically unsaturated monomer A.

5. A heat mode imaging element according to claim 4 wherein said monomer A is acrylic acid, methacrylic acid or a derivative thereof.

6. A heat mode imaging element according to claim 3 wherein said monomer B is an ester or an amide of acrylic acid or methacrylic acid wherein the alkoxysilane group is linked to the (meth)acryloyl group by the ester or the amide function.

7. A heat mode imaging element according to claim 3 wherein the amount by weight of monomer B in the polymer or the copolymer ranges from 1% to 100%.

8. A heat mode imaging element comprising in the order given:
    i) a lithographic base having a hydrophilic surface,
    ii) a heat ablatable recording layer,
    iii) a hydrophobic top layer comprising as main substance an inorganic-organic composite material wherein the inorganic phase is formed by controlled hydrolysis and polycondensation of a metal alkoxide and the organic phase is an organic polymer or copolymer linked to at least one inorganic atom and wherein the ratio of the amount by weight of the inorganic phase to the organic phase of the inorganic-organic composite is between 1% and 50%.

9. A heat mode imaging element according to claim 8 wherein said hydrophobic layer is coated on the heat ablatable layer in a dry weight in the ranges between 0.1 and 5 g/m².

10. A heat mode imaging element according to claim 8 wherein said heat ablatable recording layer is a vapour or vacuum deposited layer of a metal or a metal derivative.

11. A heat mode imaging element according to claim 8 wherein said heat ablatable recording layer is a layer coated from a dispersion.

12. A method for obtaining a heat mode imaging element comprising the following steps:
    i) image-wise or information-wise exposing to heat or actinic radiation an imaging element according to claim 1 thereby causing heating of said heat mode imaging element at the exposed areas and
    ii) rubbing with or without a liquid said exposed heat mode imaging element to remove said heat ablatable recording layer and said top layer in said exposed areas.

* * * * *